US007546992B1

(12) United States Patent
Cappolina

(10) Patent No.: US 7,546,992 B1

(45) Date of Patent: Jun. 16, 2009

(54) COLLAPSIBLE SIGN FRAME FOR DISPLAYING A SIGN PANEL

(76) Inventor: Joseph Cappolina, 58 Chewslanding Rd., Clementon, NJ (US) 08021

(*) Notice: Subject to any disclaimer, the term of this patent is extended or adjusted under 35 U.S.C. 154(b) by 444 days.

(21) Appl. No.: 11/297,137

(22) Filed: Dec. 8, 2005

Related U.S. Application Data

(63) Continuation of application No. 10/794,542, filed on Mar. 4, 2004, now abandoned.

(51) Int. Cl.
*F16M 11/38* (2006.01)

(52) U.S. Cl. .................... 248/166; 248/165; 248/440.1; 40/584; 40/603; 40/604

(58) Field of Classification Search .............. 248/440.1, 248/169, 165, 166, 163.1, 156, 434; 40/584, 40/603, 604, 606.01, 606.16, 607.05, 607.04
See application file for complete search history.

(56) References Cited

U.S. PATENT DOCUMENTS 1,662,586 A * 3/1928 Newman .................... 160/351
4,357,772 A 11/1982 Amick ........................ 40/605
4,825,575 A 5/1989 Rethke ........................ 40/610
5,340,065 A 8/1994 Thomas ...................... 248/150
5,884,424 A * 3/1999 Smith .......................... 40/610

* cited by examiner

*Primary Examiner*—Amy J. Sterling
(74) *Attorney, Agent, or Firm*—Goldstein Law Offices, P.C.

(57) ABSTRACT

A sign frame for use displaying a sign panel. The sign frame has a pair of vertical support posts, each having a bottom end, a middle area, and a spring-loaded roller extending from the top end to the middle area. A horizontal support member, having a hinged lock, attaches the vertical support posts together at the middle area. A stake is attached at the bottom end of each vertical support post for securing said post into the ground. The sign panel is attached to each of the spring-loaded rollers within each vertical support post and is displayed when the vertical support posts are extended apart and secured in the ground by the stakes. When the sign frame is disassembled, the sign retracts around the spring-loaded rollers for easily storing and transporting.

6 Claims, 2 Drawing Sheets

COLLAPSIBLE SIGN FRAME FOR DISPLAYING A SIGN PANEL

CROSS REFERENCES AND RELATED SUBJECT MATTER

This application is a continuation of patent application Ser. No. 10/794,542, filed in the United States Patent Office on Mar. 4, 2004 now abandoned.

BACKGROUND OF THE INVENTION

The invention relates to a sign frame, and more specifically, to a sign frame having a hinged support that easily collapses for transport.

Real-estate agents are constantly putting up and taking down for-sale signs. It is necessary for them to constantly load and unload these signs from their automobiles to the property for sale. Cumbersome signs are difficult to transport and maneuver and can be difficult for agents to install by themselves.

U.S. Pat. No. 4,825,575 to Rethke discloses a collapsible sign frame, comprised of hinged sections and having a ground engaging stake. U.S. Pat. No. 5,340,065 to Thomas discloses a support post for a temporary indicator such as a real estate type sign, having a hinge and a ground engaging stake. U.S. Pat. No. 4,357,772 to Amick discloses a sign support assembly comprised of a plurality of plastic modules.

While these units may be suitable for the particular purpose employed, or for general use, they would not be as suitable for the purposes of the present invention as disclosed hereafter.

SUMMARY OF THE INVENTION

It is an object of the invention to produce a sign frame that is collapsible for easily transporting and storing. Accordingly, the invention is a sign frame having two vertical support posts attached by a horizontal support member having a hinged lock. The hinged lock allows the horizontal support member to fold in half, while bringing the two vertical support posts inwardly together for easy transporting and storing.

It is another object of the invention to provide a sign frame that can easily store a sign panel therein. Accordingly the sign frame of the invention has a pair of spring-loaded rollers for attaching a sign panel therebetween. When the sign frame is collapsed the sign panel retracts around the roller of the sign frame for easy storing therein.

It is another object of the invention to provide a sign frame that is easily inserted into the ground. Accordingly, the sign frame of the invention has two ground engaging stakes for securely holding the sign frame in the ground.

The invention is a sign frame for use displaying a sign panel. The sign frame has a pair of vertical support posts, each having a bottom end, a middle area, and a spring-loaded roller extending from the top end to the middle area. A horizontal support member, having a hinged lock, attaches the vertical support posts together at the middle area. A stake is attached at the bottom end of each vertical support post for securing said post into the ground. The sign panel is attached to each of the spring-loaded rollers within each vertical support post and is displayed when the vertical support posts are extended apart and secured in the ground by the stakes. When the sign frame is disassembled, the sign retracts around the spring-loaded rollers for easily storing and transporting.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
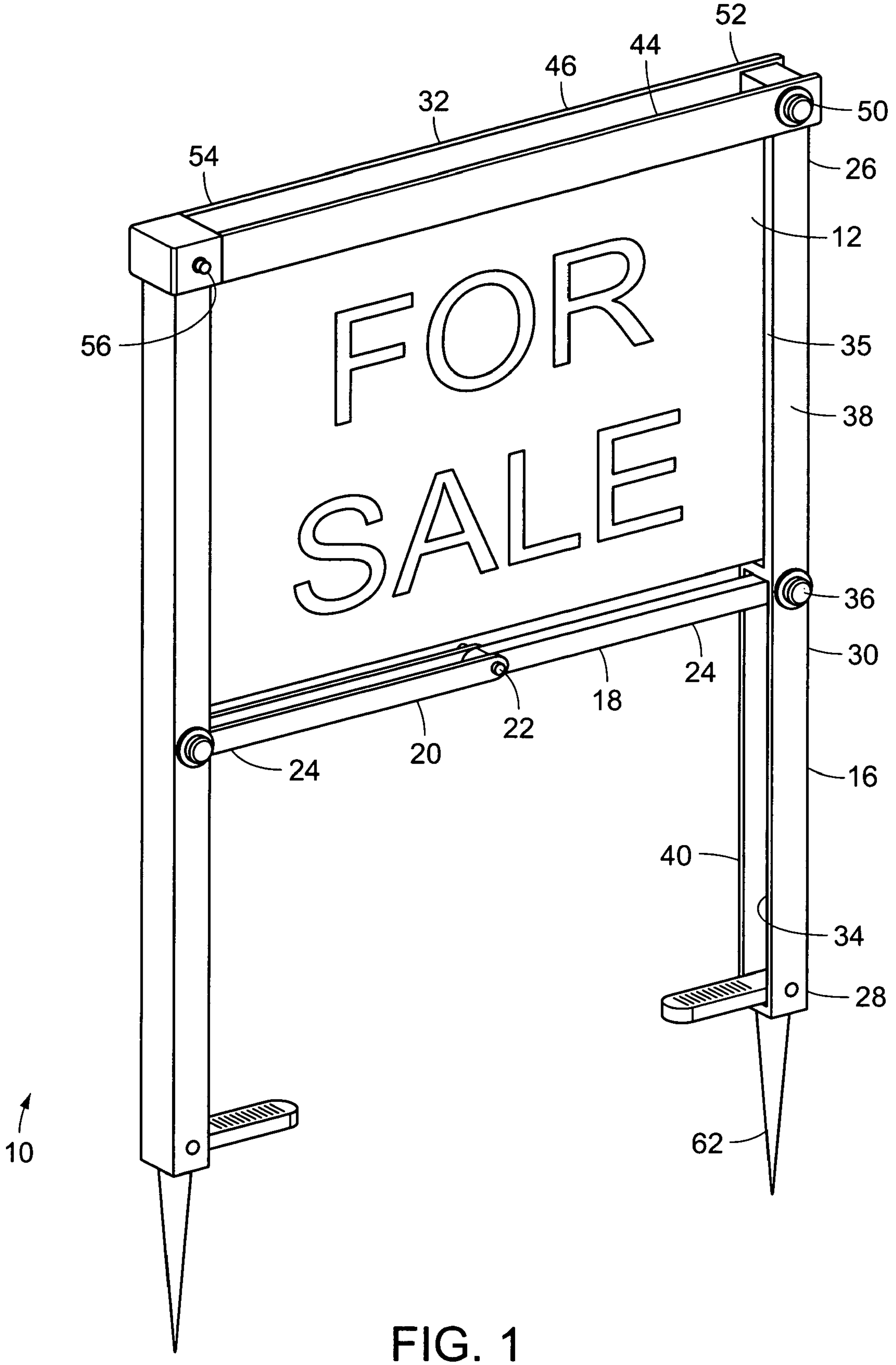
FIG. 1 is a diagrammatic perspective view of the sign frame of the present invention, having two vertical support posts attached by a horizontal support member having a hinged lock for displaying sign panels thereon.

FIG. 1 illustrates a sign frame 10 of the present invention for displaying sign panels 12, such as real-estate sign panels, thereon. The sign frame 10, preferably made from lightweight aluminum, includes two vertical support posts 16, each having a top end 26, a bottom end 28, and a middle area 30. A horizontal support member 18 extends between the two vertical support posts 16. The horizontal support member 18 has two ends 24, and a center area 20, having a hinged lock 22. The sign frame 10 also includes a horizontal arm 32 that extends between the top ends 26 of each of the vertical support posts 16. The horizontal arm 32 engages and connects to the vertical support posts 16.

Each of the vertical support posts 16 has a side cutout 34 extending from the bottom end 28 upwardly to the middle area 30, for accepting the ends 24 of the horizontal support member 18 therein. The horizontal support member 18 is attached to each vertical support posts 16 just below the middle area 30 of the vertical support posts 16. A hinged pin 36 holds each end 24 of the horizontal support member 18 within the side cutout 34 of each vertical support post 16. The vertical support posts 16 each have a front and rear surface 38 and 40. Each of the hinged pins 36 extends through the front surface 38 of the vertical support post 16, through the end 24 of the horizontal support member 18, and through the rear surface 40 of the vertical support post 16, for securely holding the horizontal support member 18 between the front and rear surface 38 and 40 of each vertical support post 16.

Each vertical support post 16 has a cutout slit 35 above the cutout side 34. The cutout slit 35 extends between the middle area 30 and the top end 26 of each vertical support post 16. The cutout slit 35 is smaller in width than the cutout side 34, for accommodating the sign panel 12 held therein. Each vertical support post 16 has a spring-loaded roller 42 attached therein, which extends for the length of the cutout slit 35. The spring-loaded roller 42 is like a window shade, for attaching to the sign 12 being supported by the sign frame 10. The sign panel 12, having two sides, preferably has a plurality of bolt connections along each side for attaching to the spring-loaded roller 42. The sign panel 12 attaches to the spring-loaded roller 42 within the cutout slit 35 of each vertical support post 16 and extends vertically from the top end 26 of each vertical support post 16 to the middle area 30 of each vertical support post 16. The sign panel 12 is attached to the vertical support posts 16 slightly higher than the horizontal support member 18 and extends vertically upward toward the horizontal arm 32. The sign panel 12 also extends horizontally between the vertical support posts 16 when the sign frame 10 is assembled for use. The sign panel 12 is preferably made of one piece of vinyl.

The horizontal arm 32 has parallel first and second members 44 and 46 and is hollow therebetween. The horizontal arm 32 also has a first and second end 52 and 54. The first member 44 rests against the front surface 38 of each vertical support post 16, while the second member 46 rests against the rear surface 40 of each vertical support post 16. A hinged pin 50 rotatably connects the first end 52 of the horizontal arm 32 to one of the vertical support posts 16. The hinged pin 50 allows the horizontal arm 32 to rotate therearound. The second end 54 of the horizontal arm 32 includes an arm clip pin 56 for rigidly engaging and connecting the horizontal arm 32 with the top end 26 of the other vertical support post 16. In particular, the arm clip 56 extends through the first member 44 of the horizontal arm 32, through the top end 26 of one of the vertical support posts 16, and through the second member 46 of the horizontal arm, for securely fastening the horizontal arm 32 to that vertical support posts 16. The horizontal arm 32 is substantially rigid and is used to hold the sign panel 12 securely within the sign frame 10 and to provide stability to the sign panel 12 when deployed.

Each vertical support member 16 has a stake 62, preferable made of aluminum, attached to the bottom end 28 of each vertical support post 16. The stakes 62 hold the sign frame 10 securely in the ground when the sign panel 12 is being displayed.

Figure 2:
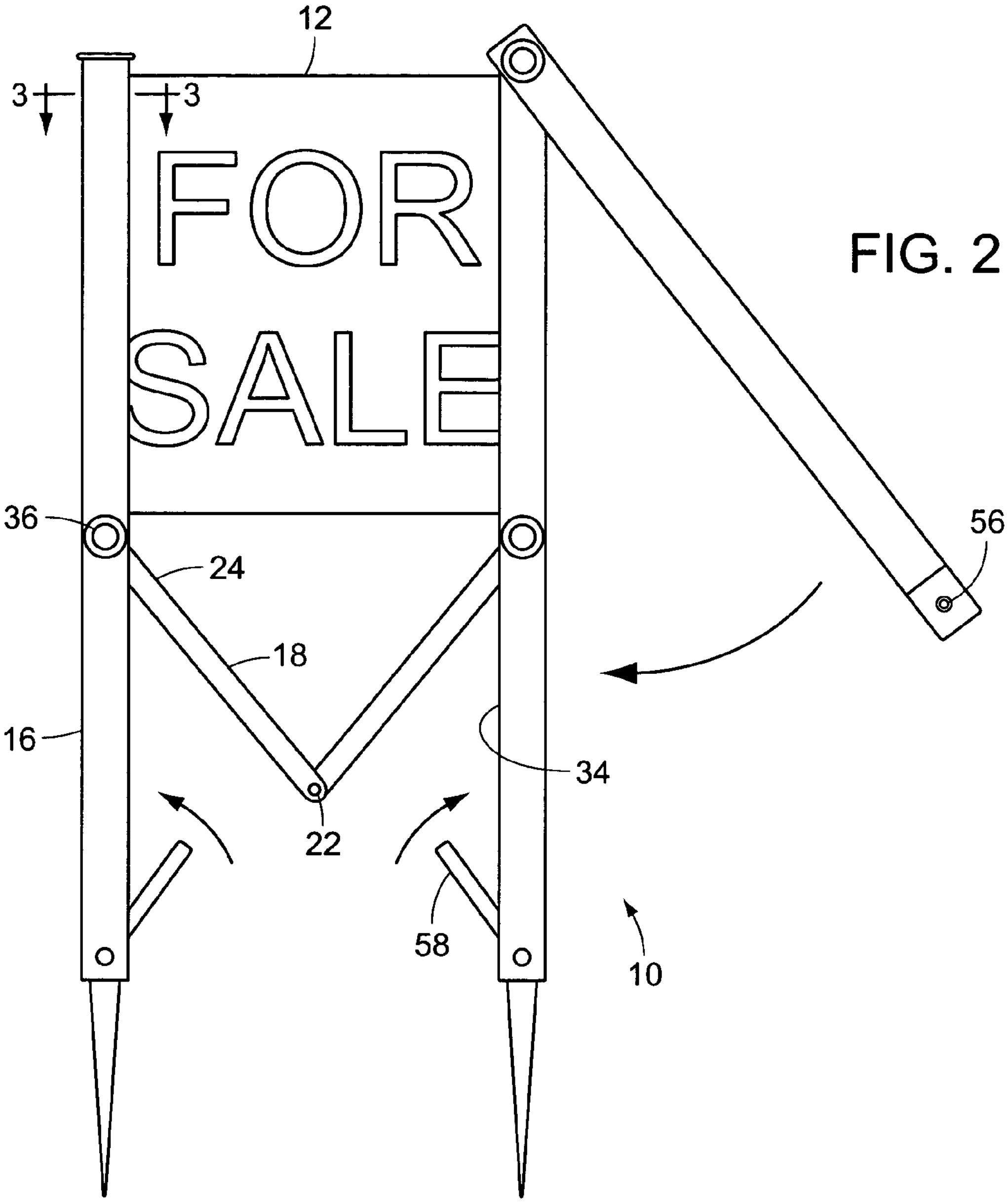
FIG. 2 is a front elevational view of the sign frame of the present invention being collapsed and disassembled for easy transport, by bending the hinged lock downwardly and moving the vertical support posts inwardly.

FIG. 2 illustrates the sign frame 10 of the present invention being disassembled. The arm clip 56 of the horizontal arm 32 is removed from the second end 54 of the horizontal arm 32. The hinged clip 50 then allows the horizontal arm 32 to rotated outwardly and swing around the sign frame 10 and collapse alongside one of the vertical support posts 16. Then, the hinged lock 22 of the horizontal support member 18 is easily pulled downwardly, thereby unlocking the hinged lock 22, and allowing the horizontal support member 18 to bend in half. The ends 24 of the horizontal support member 18 rotate at the hinged pins 36, for allowing the horizontal support member 18 to bend, and the sign frame 10 to collapse. As the hinged lock 22 is pulled downwardly, and the ends 24 of the horizontal member begin to rotate downwardly from the hinged pins 36, the vertical posts 16 are pulled inwardly toward one another for collapsing the sign frame 10. As the tension between the vertical support posts 16 loosens, the tension of the sign panel 12 loosens, and the spring-loaded rollers 42 attached to the sign panel 12 within the vertical support posts 16 begin to retract and roll-up the sign panel 12 therein. The spring-loaded rollers 42 operate like window shades, to fold-up the sign panel 12 therearound for storage. When fully collapsed, the spring-loaded rollers 42 will each roll-up half of the sign 12, allowing the hinged lock 22 to bend entirely in half, and allowing the vertical posts 16 to come together side by side. Once bent in half, the horizontal support member 18 retracts within the cutout sides 34 of each vertical support post 16.

In addition, the sign frame 10 may include foot pegs 58 attached to the bottom end 28 of each vertical support post 16. The foot pegs 58 help the user drive the stakes 62 of the vertical support posts 16 securely into the ground for use displaying sign panels 12. The user depresses downwardly onto the foot pegs 58, which help to force the stakes 62 of each vertical support post 16 into the ground. A hinged pin 60 attaches the foot pegs to the bottom end 28 of each vertical support post 16. When the sign frame 10 collapses, the foot pegs 58 rotate upwardly into the cutout side 34 of each of the vertical support members 16 for storage.

Figure 3:
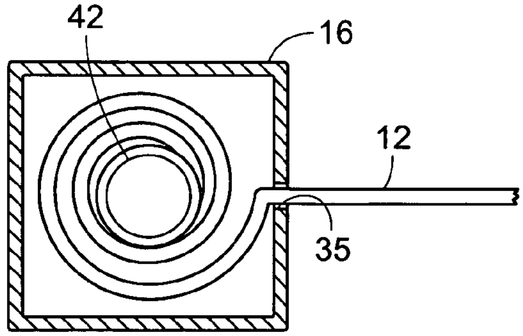
FIG. 3 is a cross-sectional view of one vertical support post of the support frame, having a spring-loaded roller therein for attaching to a sign panel, and allowing the sign panel to roll-up within the vertical support post when the sign frame is collapsed.

FIG. 3 illustrates the sign panel 12 retracted around the spring-loaded roller 42 when the sign frame 10 is collapsed for transport and storage. The sign panel 12 is shown attached to the spring-loaded roller 42 and extends outwardly through the cutout slit 35 of the vertical support post 16. The cutout slit 35 is wide enough to accommodate the sign panel 12 therethrough.

In conclusion, herein is presented a collapsible sign frame. The invention is illustrated by example in the drawing figures, and throughout the written description. It should be understood that numerous variations are possible, while adhering to the inventive concept. Such variations are contemplated as being a part of the present invention.

What is claimed is:

1. A sign frame, for use upon a ground surface, that is selectively deployed for display and collapsed for storage, comprising:

a sign panel;

a pair of vertical support posts each having a top end, a bottom end, a middle area, a stake extending downwardly from the bottom end for inserting into the ground and a foot peg extending inwardly from the bottom end to facilitate driving the stake into the ground, said vertical support posts hold the sign panel in position for display wherein the sign panel extends from the top end to the middle area of the vertical support posts;

a horizontal support member having two ends, having a center area, and having a hinged lock attached to the center area, said horizontal support member is attached at each end to the middle area of each vertical support post for extending horizontally between the vertical support posts;

a horizontal arm having a first end and second end that selectively extends between and connects the vertical support posts with a hinge pin connecting the first end of the horizontal arm to the top of the vertical posts, and an arm clip selectively engaging and connecting the horizontal arm to the top of the other of the vertical support posts, the horizontal arm is substantially rigid so as to provide stability while the sign is deployed; and a hinged lock attached at the center area of the horizontal support member, for selectively folding the horizontal support member in half when collapsing the sign frame and thereby causing the vertical support posts to come together, side by side.

2. The sign frame of claim 1, wherein the horizontal arm has a first member, a parallel second member, and is hollow therebetween, the first member rests against the front surface of each vertical support post, and the second member rests against the rear surface of each vertical support post.

3. The sign frame of claim 2, wherein each of the vertical support posts has a side cutout therefrom, which extends upwardly from the bottom end to the middle area of the vertical support posts.

4. The sign frame of claim 3, wherein a hinged pin attached each end of the horizontal support member to the side cutout of the vertical support posts.

5. The sign frame of claim 4, wherein each vertical support post has a cutout slit, which extends downwardly from the top end to the middle area of each vertical support post for accommodating the sign panel, and the sign panel extends outwardly from the vertical support posts through the cutout slit for display between vertical posts.

6. The sign frame of claim 5, wherein each vertical support post has a pair of spring-loaded rollers attached within the cutout slit of each vertical support post for attaching to the sign and rolling the sign panel therearound within each vertical support post, for storage and transport.

* * * * *